Patented Dec. 30, 1930

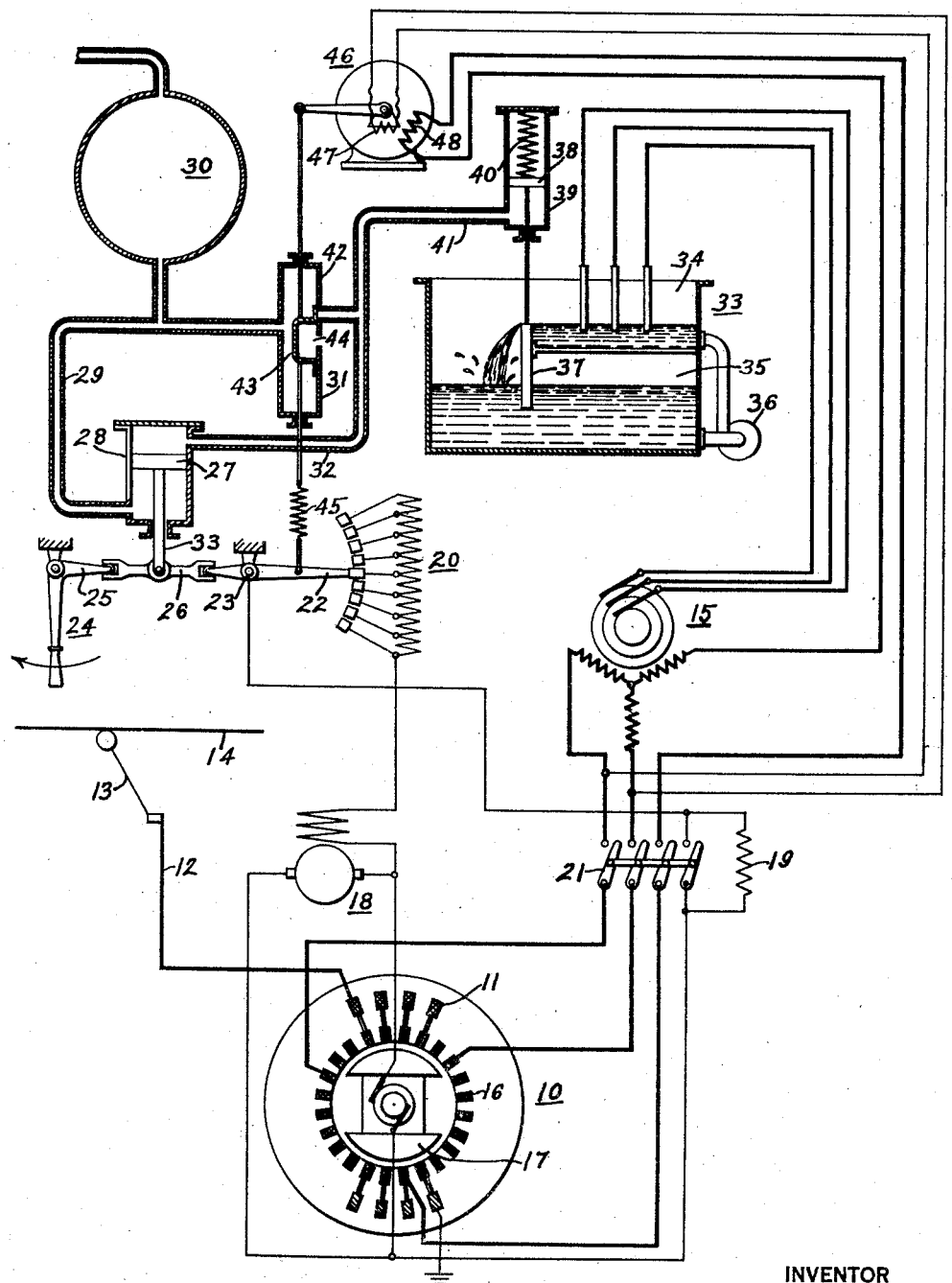

1,786,799

UNITED STATES PATENT OFFICE

KALMAN von KANDÓ, OF BUDAPEST, HUNGARY, ASSIGNOR TO WESTINGHOUSE ELECTRIC & MANUFACTURING COMPANY, A CORPORATION OF PENNSYLVANIA

CONTROL SYSTEM

Application filed July 27, 1927, Serial No. 208,802, and in Hungary July 31, 1926.

The invention relates to automatic control systems for synchronous phase converters.

The object of the invention, generally stated, is the provision of a control system that shall be simple and efficient in operation and readily installed.

A more specific object of the invention is to provide for the automatic control of the excitation of synchronous phase converters in accordance with variations in the load.

Other objects of the invention will, in part, be obvious and will, in part, appear hereinafter.

The invention, accordingly, is disclosed in the embodiment thereof shown in the accompanying drawing and comprises the features of construction, combination of elements and arrangement of parts that will be exemplified in the construction hereinafter set forth and the scope of the application of which will be indicated in the claims.

For a more complete understanding of the nature and objects of the invention, reference should be had to the following detailed description taken in connection with the accompanying drawing, in which:

The single figure is a diagram of a control system arranged in accordance with this invention.

Referring now to the drawing, 10 designates, generally, a phase converter of any well known type. In this particular embodiment of the invention, the phase converter illustrated is adapted for converting single-phase currents to 3-phase currents.

As illustrated, the primary windings 11 of the phase converter 10 are connected to any suitable source of electrical energy by means of a conductor 12 and a trolley pole 13. The secondary windings 16 of the phase converter are connected to the primary stator windings of the motor 15, a switch 21 being interposed between the motor and the converter to permit the opening of the circuit, when desired.

The excitation of the phase converter is effected by means of a field winding provided on the rotor 17. In this case, a generator 18 is provided for energizing the field windings provided on the rotor 17.

In order to control the excitation of the phase converter, two resistors 19 and 20 are connected in the field circuit of the exciter or generator 18. As will be observed, the resistor 19 is not variable and it is disposed to be short circuited when the switch 21 is closed to connect the motor across the secondary winding 16 of the phase converter, while the resistor 20 is variable.

The variable resistor or rheostat 20 is provided with a contact arm 22 pivotally mounted at 23. In order to actuate the rheostat contact arm manually, an engineer's lever 24, which simulates a bell crank, is provided. The engineer's lever has an inwardly extending arm 25. Interposed between, and pivotally connected to, the arm 25 of the engineer's lever and the contact arm 22 is a lever 26. As shown, the lever 26 is pivotally suspended from the piston 27 which is slidably mounted in the cylinder 28.

As shown, the lower end of the cylinder 28 is connected, through a pipe line 29, to a compressed-air reservoir 30, while the upper end of the cylinder is connected to the air reservoir through a slide valve 31 and a pipe line 32. In this construction, the connecting rod, by means of which the lever 26 is suspended from the piston 27, is made from tubing or the like, which has a relatively large cross-sectional area, so that the area of the underside of the piston exposed to air pressure is considerably lower than the area of the upper side of the piston. Therefore, if the air pressures in the upper and lower sections of the cylinder are substantially alike, the piston will move downwardly.

The secondary or rotor windings of the motor 15 are connected to the electrodes of a liquid rheostat 33. Therefore, the acceleration of the motor may be controlled by means of the rheostat 33 which may be operated step-by-step, in any suitable manner.

In this case, the liquid rheostat is provided with an electrode compartment 34, an electrolyte well 35 and a motor driven pump 36 for circulating the electrolyte. The height of the electrolyte in the electrode compartment 34 may be varied by means of adjustable weir 37.

As illustrated, the weir is suspended from a piston 38 slidably mounted in a cylinder 39. The piston is biased to its lowermost position by a spring 40. In order to raise the piston, the lower end of the cylinder 39 is connected, through a pipe 41, to the compressed-air reservoir 30. The flow of air from the reservoir to the cylinder 39 is controlled by means of the slide valve 31.

The valve 31 comprises a cylinder 42 in which the valve gate 43 is slidably mounted. As illustrated, the cylinder is provided with a port 44 communicating with the atmosphere. The valve gate is made of substantially U-shape and, when raised to its uppermost position, it connects the cylinder 39 to the atmosphere through the pipe 41 and the port 44.

In order to actuate the valve gate 43 downwardly, it is connected to the contact arm 22 of the rheostat through a spring 45. The upward movement of the valve gate is effected by means of a torque motor 46 which is provided with windings 47 and 48. As will be observed, the winding 47 of the motor 46 is connected across one phase of the windings of motor 15, while the winding 48 is connected in series with one phase of the windings of the motor 15. Accordingly, the torque of the motor 46 will vary when the load on the motor 15 is changed.

In operation, the phase converter 10 may be started by any well known means such, for example, as a starting and accelerating motor, and, since such practice in starting phase converters is well known in the art, it has been considered unnecessary to show it in the drawing.

When the converter is being operated from the main source of power, the primary windings of the motor 15 are connected to the secondary windings of the converter by the closing of the switch 21.

It will be observed that, when the switch 21 is closed, the resistor 19 is short circuited, thereby cutting it out of the exciter field in order to increase the excitation of the phase converter and compensate for the armature reaction caused by the current delivered to the primary windings of the motor 15.

Before the motor is started, the weir 37 stands in its lowermost position, and the starting resistance of the rheostat 33 has its maximum value. In order to start the motor, the engineer's lever 24 is actuated one step in the direction of the arrow, rotating the lever 26 counter-clockwise and the contact arm 22 clockwise about their pivot points, thereby reducing the resistance in the exciter field circuit and increasing the excitation of the phase converter.

The actuation of the contact arm 22 increases the tension of the spring 45 and draws the valve 43 downwardly to admit compressed air into the cylinder 39. As compressed air flows into the cylinder, the piston 38 is actuated upwardly to compress the spring 40. In this manner, the weir 37 is raised, and a quantity of the electrolyte circulating in the rheostat is trapped in the electrode compartment to immerse the lower ends of the electrodes and permit current to flow in the secondary of the motor to start it. When a load is thus thrown on the motor 15, the windings of the motor 46 are energized, and the valve 43 is raised to cut off the supply of air to the cylinder 39.

When the engineer's lever 24 is actuated in the direction of the arrow, an operation similar to that described hereinabove is effected, and the current flowing in the secondary of the motor is increased. In such manner, the motor may be accelerated and the torque automatically kept constant, or the operator may vary the torque during the acceleration of the motor and the excitation of the converter is controlled to conform to the load.

When the motor reaches its synchronous speed, the piston 38 will have reached its uppermost position. In designing the control system, provision is made for actuating the piston 38 to its uppermost position when subjected to an air pressure which is not great enough to actuate the piston 27 downwardly against the air pressure in the reservoir 30 which is applied directly to the underside of the piston 27.

Assuming now that the motor 15 is operating at synchronous speed and that the load is decreased, then the torque on the motor 46 is decreased and the valve 43 is drawn downwardly under the influence of the spring 45. The upper end of the cylinder 28 is thereby directly connected to the air reservoir and the pressure builds up to a value sufficient to move the piston 27 downwardly. As will be observed, if the engineer's lever remains stationary, the lever 26 is rotated clockwise about its pivot point to actuate the contact arm 22 of the rheostat 20 to increase the resistance in the field circuit of the exciter 18.

If the load on the motor 15 is increased, then the torque on the motor 46 is increased and the valve 43 is actuated upwardly connecting the upper end of the cylinder 28 to the atmosphere through the port 44. Immediately, the air pressure on the under side of the piston 27 actuates it upwardly to operate the lever 26 and contact arm 22 to decrease the resistance in the field circuit of the exciter 18.

In this manner, provision is made for varying the excitation of the phase converter as the load on the motor 46 varies. Further, it will be readily understood that the control of the excitation of the phase converter is automatic after the motor has reached its synchronous speed.

Since various changes may be made in the above described construction and arrangement of parts, and different embodiments of the invention may be made without departing from the scope thereof, it is intended that all matter contained in the above description or shown in the accompanying drawing shall be interpreted as illustrative and not in a limiting sense.

I claim as my invention:

1. In a control system, a source of single-phase alternating-circuit power, an alternating-current phase converter for changing said single-phase alternating-current power to polyphase alternating-current power, said converter having a direct-current field winding, a wound-rotor polyphase alternating-current motor disposed for energization by said converter with polyphase-current power, a variable rheostat connected to the windings of the rotor of said motor, an exciter-generator for supplying the field windings of said converter with direct current, voltage-regulating means for said exciter whereby the excitation of the converter may be varied to control the power-factor thereof, pressure-responsive means for actuating said variable rheostat and voltage-regulating means simultaneously whereby the resistance of the rotor and the voltage of said exciter may be adjusted to effect operation of the converter at a predetermined power factor, and means operable in response to the value of current traversing said polyphase motor for actuating the pressure-responsive means.

2. In a power system comprising a phase-converter for changing single-phase alternating current to polyphase alternating current, a polyphase alternating-current wound-rotor motor connected for energization to the converter, and an exciter generator for supplying the converter with direct-current excitation, in combination, a variable rheostat for controlling the resistance of the rotor of said motor, a variable rheostat for governing the voltage developed by said exciter-generator, pressure-responsive means for actuating said variable rheostats jointly whereby the resistance of said wound rotor and the voltage of said exciter generator may be regulated to effect operation of the converter at a power factor of a predetermined value, and means responsive to the current traversing said motor to effect operation of said pressure-responsive means and thereby to maintain operation of said converter at the predetermined power-factor.

3. In a control system for regulating the power factor of a phase converter having direct-current field windings and which supplies polyphase alternating-current power to a polyphase induction motor, the rotor of which is provided with a plurality of phase windings, in combination, a rheostat for varying the resistance of a circuit including said phase windings, a variable-voltage device for supplying direct-current power to the field windings of said converter, fluid-pressure means for actuating said rheostat and variable-voltage device simultaneously whereby the resistance of the rotor winding circuit and the excitation of said field windings may be adjusted to effect operation of the converter at a power factor of a predetermined value, and means operably responsive to the current traversing said motor for controlling the operation of said fluid-pressure means whereby said power factor may be maintained as the motor current varies from one value to another.

4. In a control system for regulating the power factor of a phase converter having direct-current field windings and which supplies polyphase alternating-current power to a polyphase induction motor, the rotor of which is provided with a plurality of phase windings, in combination, a rheostat for varying the resistance of a circuit including said phase windings, a variable-voltage device for supplying direct-current power to the field windings of said converter, fluid-pressure means for actuating said rheostat and variable-voltage device simultaneously whereby the resistance of the rotor-winding circuit and the excitation of said field windings may be adjusted to effect operation of the converter at a power factor of a predetermined value, means operably responsive to the current traversing said motor for controlling the operation of said fluid-pressure means whereby said power factor may be maintained as the motor current varies from one value to another, and manually operable means for controlling the range of operation of the variable-voltage-device actuating means.

In testimony whereof, I have hereunto subscribed my name this 25th day of July, 1927.

KALMAN von KANDÓ.